(12) United States Patent
Ueda et al.

(10) Patent No.: US 11,784,522 B2
(45) Date of Patent: Oct. 10, 2023

(54) ROTOR

(71) Applicant: NIDEC CORPORATION, Kyoto (JP)

(72) Inventors: Tomoya Ueda, Kyoto (JP); Toshiyuki Sasaki, Kyoto (JP); Yabo Hu, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/666,506

(22) Filed: Feb. 7, 2022

(65) Prior Publication Data

US 2022/0255378 A1 Aug. 11, 2022

(30) Foreign Application Priority Data

Feb. 8, 2021 (JP) ................................ 2021-018629

(51) Int. Cl.
*H02K 1/00* (2006.01)
*H02K 1/276* (2022.01)
*H02K 1/279* (2022.01)

(52) U.S. Cl.
CPC .......... *H02K 1/2773* (2013.01); *H02K 1/279* (2022.01); *H02K 2213/03* (2013.01)

(58) Field of Classification Search
CPC .. H02K 1/2773; H02K 1/279; H02K 2213/03; H02K 1/2781; H02K 1/30
See application file for complete search history.

(56) References Cited

U.S. PATENT DOCUMENTS

| | | | |
|---|---|---|---|
| 2012/0098372 A1* | 4/2012 | Saji ........................ | H02K 1/278 310/152 |
| 2016/0099619 A1* | 4/2016 | Popov .................... | H02K 1/278 310/156.12 |

FOREIGN PATENT DOCUMENTS

JP  2003037954  2/2003

OTHER PUBLICATIONS

JP-2003037954-A (Year: 2003).*
JP-2016163395-A (Year: 2016).*
JP-2019146427-A (Year: 2019).*

* cited by examiner

*Primary Examiner* — Quyen P Leung
*Assistant Examiner* — Elrasheed E. B. Hamdan
(74) *Attorney, Agent, or Firm* — JCIPRNET

(57) ABSTRACT

A rotor includes: a shaft; a tubular rotor core; and a plurality of magnets. The shaft extends along a center axis. The rotor core surrounds the shaft. The plurality of magnets is disposed outside the rotor core in a radial direction and is aligned in a circumferential direction. A plurality of first recessed portions recessed outward in the radial direction is aligned in the circumferential direction in an inner surface of the rotor core in the radial direction. Each of the first recessed portions overlaps each of the magnets in the radial direction.

17 Claims, 3 Drawing Sheets

ROTOR

CROSS-REFERENCE TO RELATED APPLICATIONS

The present invention claims priority under 35 U.S.C. § 119 to Japanese Application No. 2021-018629 filed on Feb. 8, 2021 the entire content of which is incorporated herein by reference.

FIELD OF THE INVENTION

The disclosure relates to a rotor and a deceleration device including the same.

BACKGROUND

A rotor in the related art includes a shaft, a rotor core, and magnets. The rotor core surrounds the shaft and is defined into a tubular shape. The plurality of magnets is disposed outside the rotor core in the radial direction and is aligned in a circumferential direction.

However, the weight of the rotor core is large in the rotor in the related art, and there is a probability that rotation efficiency of the rotor may be degraded.

SUMMARY

A rotor according to an exemplary embodiment of the disclosure includes: a shaft; a tubular rotor core; and a plurality of magnets. The shaft extends along a center axis. The rotor core surrounds the shaft. The plurality of magnets is disposed outside the rotor core in a radial direction and is aligned in a circumferential direction. A plurality of first recessed portions recessed outward in the radial direction is aligned in the circumferential direction in an inner surface of the rotor core in the radial direction. Each first recessed portion overlaps each magnet in the radial direction.

The above and other elements, features, steps, characteristics and advantages of the present disclosure will become more apparent from the following detailed description of the preferred embodiments with reference to the attached drawings.

DETAILED DESCRIPTION

Hereinafter, exemplary embodiments of the disclosure will be described in detail with reference to the drawings. In the specification, a rotation axis of a shaft 11 will be referred to as a "center axis C" and a direction that is parallel to the center axis C will be referred to as an "axial direction" in a deceleration device 100. Also, a direction that perpendicularly intersects the center axis C of the shaft 11 will be referred to as a "radial direction", and a direction that follows an arc around the center axis C of the shaft 11 will be referred to as a "circumferential direction". Also, in the present application, shapes and positional relationships of components will be described on the assumption that the axial direction is an up-down direction. The up-down direction is a name used merely for explanation and is not intended to limit actual positional relationships and directions in the deceleration device 100.

Figure 1:
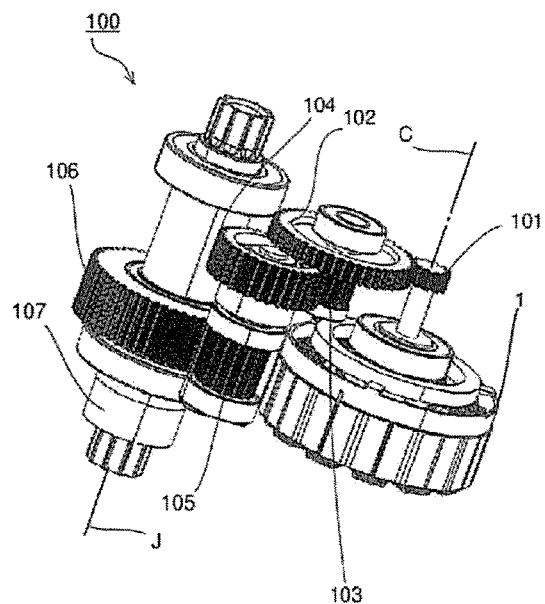
FIG. 1 is a perspective view of a deceleration device according to a first exemplary embodiment of the disclosure.

A deceleration device according to an exemplary embodiment of the disclosure will be described below. FIG. 1 is a perspective view of the deceleration device 100 according to the present embodiment. In FIG. 1, a housing as an outer frame of the deceleration device 100 is not illustrated.

The deceleration device 100 converts a rotational motion at a first rotation frequency into a rotation motion at a second rotation frequency that is lower than the first rotation frequency. The deceleration device 100 is incorporated and used in a drive mechanism for an electric assist bicycle, for example. However, the deceleration device 100 according to the disclosure may be used for other applications.

The deceleration device 100 includes a rotor 10, which will be described later, and an input gear (gear) 101 coupled to the shaft 11. Specifically, the deceleration device 100 includes a motor 1 including the rotor 10, an input gear (gear) 101, intermediate gears 102, 103, 104, and 105, an output gear 106, and a housing (not illustrated). The housing accommodates the motor 1, the input gear 101, the intermediate gears 102, 103, 104, and 105, and the output gear 106 therein. The input gear 101 is connected to the shaft 11 of the motor 1, which will be described later, and rotates about the center axis C along with the shaft 11.

The output gear 106 rotates about an output axis J. The input gear 101 and the output gear 106 are connected via the intermediate gears 102, 103, 104, and 105.

A torque output from the motor 1 is delivered via the input gear 101, the intermediate gears 102, 103, 104, and 105, and the output gear 106 in this order. The gear ratio and the number of each type of gears may be modified in various manners in accordance with a deceleration ratio required. In the deceleration device 100 incorporated and used in a drive mechanism for an electric assist bicycle, for example, the output gear 106 is disposed around a crankshaft 107 that rotates about the output axis J. A sprocket (not illustrated) is coupled to the crankshaft 107, and wheels are rotated by a chain (not illustrated) connected to the sprocket being turned. The crankshaft is coupled to pedals, and it is possible to assist a pedal stepping power through rotation of the output gear 106.

Figure 2:
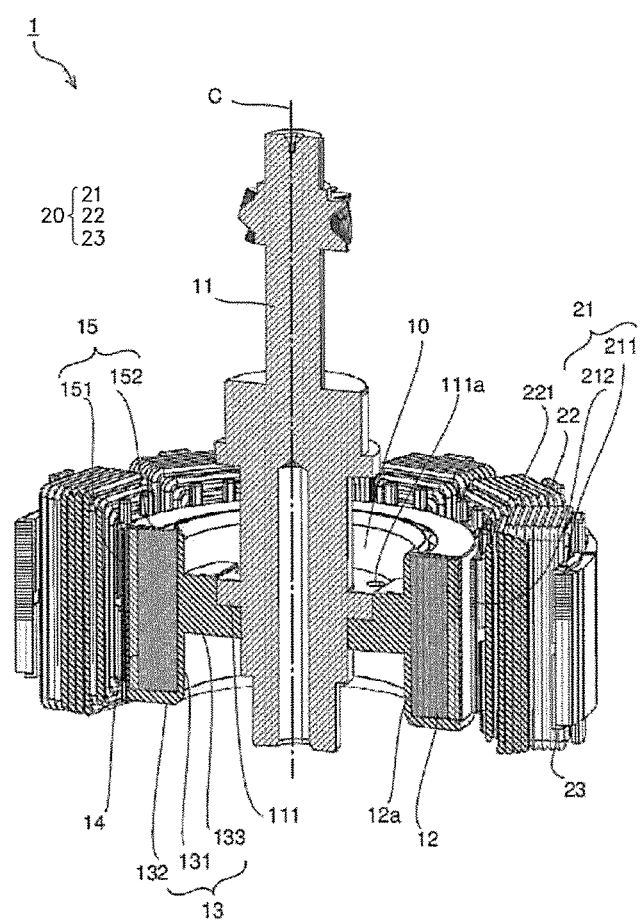
FIG. 2 is a vertical sectional perspective view of a motor according to the first exemplary embodiment of the disclosure.
Figure 3:
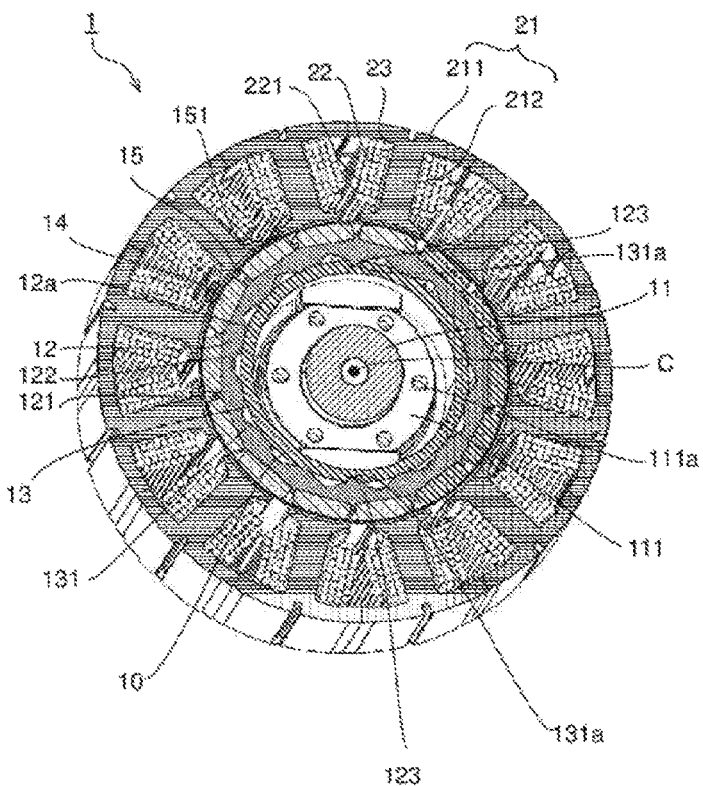
FIG. 3 is a horizontal sectional perspective view of the motor according to the first exemplary embodiment of the disclosure.
Figure 4:
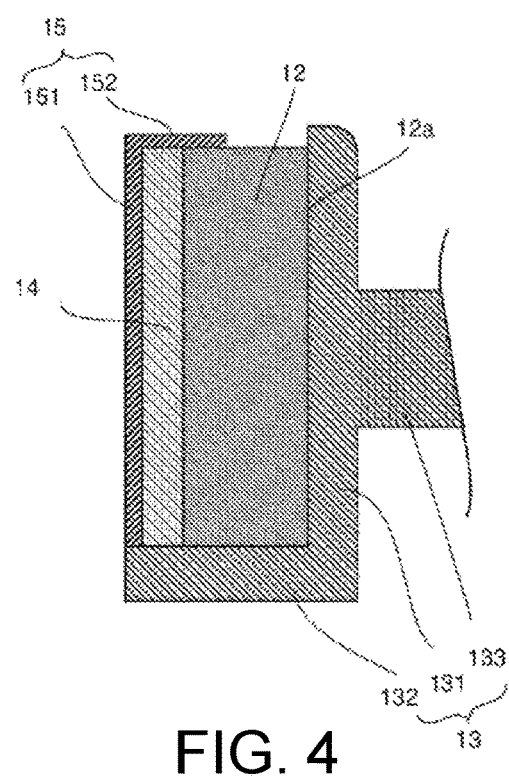
FIG. 4 is a schematic vertical sectional view illustrating a portion of a rotor in an enlarged manner according to the first exemplary embodiment of the disclosure.

FIGS. 2 and 3 are a vertical sectional perspective view and a horizontal sectional perspective view of the motor 1. FIG. 4 is a schematic vertical sectional view illustrating a portion of the rotor 10 in an enlarged manner. The motor 1 includes the rotor 10 and a stator 20.

The rotor 10 is able to rotate about the center axis C extending in the up-down direction. The rotor 10 includes the shaft 11, a rotor core 12, a coupling member 13, a plurality of magnets 14, and a cover member 15.

The shaft 11 is a columnar-shaped metal member extending along the center axis C. The shaft 11 includes an annular portion 111. The annular portion 111 is provided to project from the outer surface of the shaft 11 in the radial direction.

The annular portion 111 includes screw holes 111a penetrating in the axial direction. The plurality of screw holes 111a is aligned at substantially equal intervals in the circumferential direction.

The shaft 11 is rotatably supported via a bearing (not illustrated). As the bearing, a ball bearing is used, for example. A slide bearing or a fluid pressure bearing, for example, may be used instead of the ball bearing.

The rotor core 12 is defined into a tubular shape by laminating a plurality of annular electromagnetic steel sheets in the axial direction and includes, at the center, a through-hole 12a extending in the axial direction. The coupling member 13 and the shaft 11 are disposed inside the through-hole 12a, and the rotor core 12 surrounds the coupling member 13 and the shaft 11.

The rotor core 12 includes projecting portions 121 and male portions 123. The projecting portions 121 project outward in the radial direction from the outer surface of the rotor core 12 in the radial direction and extend in the axial direction. The plurality of projecting portions 121 is aligned at substantially equal intervals in the circumferential direction (see FIG. 3).

Also, a plurality of first recessed portions 122 recessed outward in the radial direction is aligned in an inner surface of the rotor core 12 in the radial direction at substantially equal intervals in the circumferential direction. It is possible to reduce the weight of the rotor core 12 and to improve rotation efficiency of the rotor 10 by providing the first recessed portions 122. The detailed shape of the first recessed portions 122 will be described later in detail.

The male portions 123 project inward in the radial direction from the inner surface of the rotor core 12 in the radial direction and are provided at two locations such that the male portions 123 face each other in the radial direction.

The coupling member 13 is disposed inside the rotor core 12 in the radial direction and couples the rotor core 12 to the shaft 11. The coupling member 13 includes a body portion 131, a flange portion 132, and a securing portion 133. The body portion 131 surrounds the shaft 11 and is defined into a tubular shape. The body portion 131 includes female portions 131a (see FIG. 3). The female portions 131a are recessed inward in the radial direction from the outer surface in the radial direction and are provided at two locations such that the female portions 131a face each other in the radial direction. The body portion 131 is pressure-fitted into and secured to the through-hole 12a of the rotor core 12. At this time, the male portions 123 are pressure-fitted into the female portions 131a. In other words, the female portions 131a accommodates the male portions 123. In this manner, the coupling member 13 and the rotor core 12 are firmly secured in the circumferential direction.

The securing portion 133 extends inward in the radial direction from the inner surface of the body portion 131 in the radial direction and is defined into an annular shape. The securing portion 133 includes securing screw holes (not illustrated) recessed in the axial direction. The plurality of screw holes is aligned at substantially equal intervals in the circumferential direction. The securing portion 133 is caused to overlap the annular portion 111 of the shaft 11 in the axial direction. At this time, the screw holes 111a and the securing screw holes overlap each other in the axial direction and are screw-fastened via screws (not illustrated). In this manner, the shaft 11 and the coupling member 13 are secured.

The flange portion 132 extends outward in the radial direction from one end (the lower end in the present embodiment) of the body portion 131 in the axial direction. An outer end of the flange portion 132 in the radial direction is located further outward in the radial direction than outer ends of the magnets 14 in the radial direction. In this manner, the flange portion 132 faces the magnets 14 and the rotor core 12 in the axial direction and supports the magnets 14 and the rotor core 12 in the axial direction.

The plurality of magnets 14 is disposed outside the rotor core 12 in the radial direction and are aligned in the circumferential direction. The magnets 14 have substantially rectangular parallelepiped shapes and are defined by magnetic members. The magnets 14 are secured to the outer surface of the rotor core 12 in the radial direction via an adhesive (not illustrated). At this time, the magnets 14 that are adjacent in the circumferential direction are disposed with the projecting portions 121 of the rotor core 12 sandwiched therebetween. It is possible to easily position the magnets 14 relative to the rotor core 12 by providing the projecting portions 121.

The magnets 14 have S poles and N poles facing each other in the radial direction, and adjacent magnets 14 have different magnetic poles on the outer surfaces in the radial direction. In other words, the magnets 14 having S magnetic pole surfaces as outer surfaces in the radial direction and the magnets 14 having N magnetic pole surfaces as outer surfaces in the radial direction are alternately aligned in the circumferential direction.

The cover member 15 is disposed outside the magnets 14 in the radial direction. The cover member 15 holds the magnets 14. The cover member 15 is defined by magnetic bodies such as iron and is provided, for example, through press working. The cover member 15 includes a circumferential surface portion 151 and a hood portion 152. The circumferential surface portion 151 is defined into a tubular shape and faces the magnets 14 in the radial direction.

The hood portion 152 extends inward in the radial direction from the other end (the upper end in the present embodiment) of the circumferential surface portion 151 in the axial direction. An inner end of the hood portion 152 in the radial direction is located further inward in the radial direction than the inner ends of the magnets 14 in the radial direction, and at least a portion of the hood portion 152 overlaps the rotor core 12 in the axial direction. In this manner, the hood portion 152 faces and comes into contact with the magnets 14 and the rotor core 12 in the axial direction. The hood portion 152 is secured to the rotor core 12 via an adhesive, for example. Therefore, it is possible to prevent the magnets 14 from being detached upward in the axial direction when the rotor 10 rotates. At this time, the cover member 15 is defined by a magnetic body, and the cover member 15 is thus secured to the magnets 14 by a magnetic force. Therefore, it is possible to further prevent the magnets 14 from being detached upward in the axial direction when the rotor 10 rotates.

The stator 20 is disposed to face the outer side of the rotor 10 in the radial direction and includes a stator core 21, a plurality of coils 22, and an insulator 23.

The stator core 21 is provided by laminating a plurality of annular electromagnetic steel plates in the axial direction. The stator core 21 includes an annular core back portion 211 and a plurality of teeth portions 212 projecting inward in the radial direction from the core back portion 211. The plurality of teeth portions 212 is aligned at substantially equal intervals in the circumferential direction.

The insulator 23 is defined by an insulating resin molded article and covers at least a portion of the stator core 21.

The coils 22 are defined by winding conductive wires 221 around the teeth portion 212 via the insulator 23. The insulator 23 establishes insulation between the stator core 21 and the conductive wire 221.

If a drive current is applied to the coils 22, then a magnetic flux is caused in the plurality of teeth portions 212. A torque in the circumferential direction is generated by magnetic attracting force and repulsive force between the teeth portions 212 and the magnets 14. As a result, the rotor 10 rotates about the center axis C relative to the stator 20.

Figure 5:
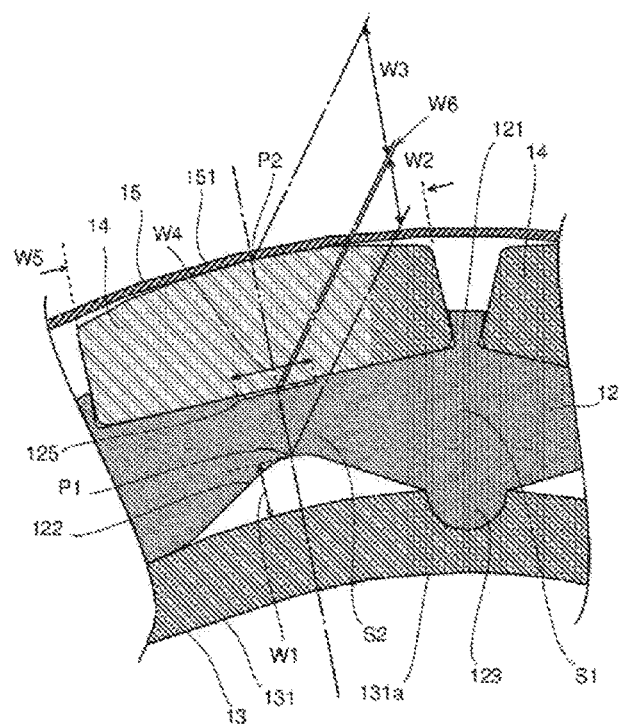
FIG. 5 is a schematic horizontal sectional view illustrating a portion of the rotor in an enlarged manner according to the first exemplary embodiment of the disclosure.

FIG. 5 is a schematic horizontal sectional view illustrating a portion of the rotor 10 in an enlarged manner. The adjacent magnets 14 have different magnetic poles on the inner surfaces in the radial direction, and the magnetic flux generated from the inner surfaces of the magnets 14 in the radial direction is branched on both sides in the circumferential direction, passes through the rotor core 12, and is directed to each of the inner surfaces of the adjacent magnets 14 on both the sides in the radial direction. Therefore, magnetic flux density in a first region S1 of the rotor core 12 facing boundary portions of the adjacent magnets 14 in the radial direction is greater than magnetic flux density in a second region S2 of the rotor core 12 facing, in the radial direction, a center P2 of the magnets 14 in the circumferential direction.

A magnetic resistance of the first recessed portions 122 is greater than a magnetic resistance on the electromagnetic steel sheet of the rotor core 12. However, each first recessed portion 122 overlaps each magnet 14 in the radial direction. More specifically, the center P1 of the first recessed portions 122 in the circumferential direction overlaps the center P2 of the magnets 14 in the circumferential direction in the radial direction. In this manner, the first recessed portions 122 are disposed in a region with low magnetic flux density, and it is possible to reduce the weight of the rotor core 12 while reducing a magnetic loss of the entire rotor core 12.

Also, the first recessed portions 122 are bent and recessed outward in the radial direction and are provided linearly symmetrically in the circumferential direction. In this manner, the magnetic loss of the first recessed portion 122 is linearly symmetric in the circumferential direction. In this manner, it is possible to reduce the situation in which magnetic flux density generated from the inner surfaces of the magnets 14 in the radial direction and branched on both sides in the circumferential direction differs in the circumferential direction.

Also, a depth W1 of the first recessed portions 122 in the radial direction is smaller than a maximum value W3 of a thickness of the magnets 14 in the radial direction. In this manner, it is possible to provide the first recessed portion 122 to be small in the radial direction and to reduce a magnetic loss of the first recessed portions 122. The depth W1 may be defined to be greater than a distance W2 in the radial direction between the outer surface of the rotor core 12 in the radial direction and the outer end of the first recessed portion 122 in the radial direction. In this manner, it is possible to reduce the weight of the rotor core 12 while reducing a magnetic loss of the entire rotor core 12.

Also, second recessed portions 125 recessed inward in the radial direction are further aligned in the circumferential direction in the outer surface of the rotor core 12 in the radial direction. The plurality of second recessed portions 125 extends in the axial direction and is aligned at substantially equal intervals in the circumferential direction. A magnetic resistance of the second recessed portions 125 is greater than the magnetic resistance of the electromagnetic steel sheet of the rotor core 12 similarly to the first recessed portions 122.

However, each second recessed portion 125 overlaps each magnet 14 in the radial direction. In this manner, the second recessed portions 125 are disposed in a region with small magnetic flux density, and it is possible to further reduce the weight of the rotor core 12 while reducing a magnetic loss of the entire rotor core 12.

Also, a length W4 of the second recessed portions 125 in the circumferential direction is equal to or less than a half of a length W5 of the magnets 14 in the circumferential direction. Also, a depth W6 of the second recessed portions 125 in the radial direction is less than the depth W1 of the first recessed portions 122 in the radial direction. It is possible to define the second recessed portions 125 disposed to be closer to the magnets 14 than the first recessed portions 122 to be smaller than the first recessed portions 122 in the radial direction and to reduce a magnetic loss of the second recessed portions 125. It is thus possible to reduce a magnetic loss of the entire rotor core 12.

Also, the adhesive (not illustrated) for securing the rotor core 12 to the magnets 14 is applied to the second recessed portions 125. In other words, the rotor 10 includes the adhesive accommodated in the second recessed portions 125, and the adhesive causes the magnets 14 and the rotor core 12 to adhere to each other. The adhesive is easily positioned by providing the second recessed portions 125. Also, it is possible to reduce definition of a gap between the rotor core 12 and the magnets 14 due to the thickness of the adhesiveness.

Figure 6:
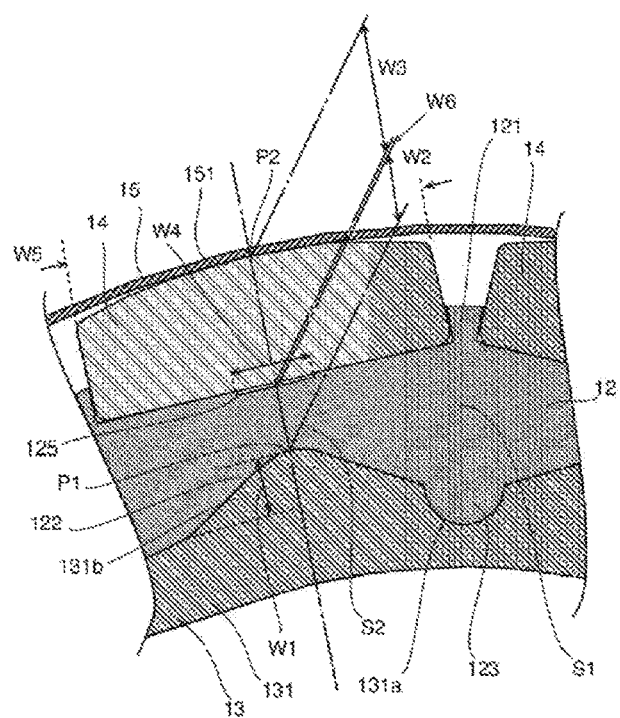
FIG. 6 is a schematic horizontal sectional view illustrating a portion of a rotor in an enlarged manner according to a second exemplary embodiment of the disclosure.

Next, a second exemplary embodiment of the disclosure will be described. FIG. 6 is a vertical sectional view illustrating a portion of a rotor 10 in an enlarged manner according to the second exemplary embodiment. For convenience of explanation, the same reference signs will be applied to components that are similar to those in the first exemplary embodiment illustrated in FIGS. 1 to 5 described above. The second exemplary embodiment is different from the first exemplary embodiment in the shape of the coupling member 13. The other components are similar to those in the first exemplary embodiment, and advantages that are similar to those of the first exemplary embodiment are obtained.

The coupling member 13 includes protruding portions 131b. The protruding portions 131b project outward in the radial direction from the outer surface of the body portion 131 in the radial direction and extend in the axial direction. Also, the plurality of protruding portions 131b is aligned in the circumferential direction, and each protruding portion 131b is fitted into each first recessed portion 122. In other words, the coupling member 13 includes the plurality of protruding portions 131b projecting outward in the radial direction from the outer surface in the radial direction and aligned in the circumferential direction, and each protruding portion 131b is fitted into each first recessed portion 122. In this manner, the coupling member 13 and the rotor core 12 are more firmly secured in the circumferential direction.

The aforementioned embodiments are only examples of the disclosure. The configurations of the exemplary embodiments may be appropriately modified without departing from the technical idea of the disclosure. Also, the exemplary embodiments may be implemented in combination within an available range.

For example, although the female portions 131a are provided in the coupling member 13 and the male portions 123 are provided in the rotor core 12 in the present embodiments, the male portions may be provided in the coupling member 13, and the female portions may be provided in the rotor core 12. At this time, the male portions project outward in the radial direction from the outer surface of the coupling member 13 in the radial direction, and the female portions are recessed outward in the radial direction from the inner surface of the rotor core 12 in the radial direction. In other words, the male portions projecting in the radial direction from one of the outer surface of the coupling member 13 in the radial direction and the inner surface of the rotor core 12 in the radial direction and the female portions recessed in the radial direction from the other one of the outer surface of the coupling member 13 in the radial direction and the inner surface of the rotor core 12 in the radial direction and accommodating the male portions are included.

The disclosure may be implemented and used in a drive mechanism for a robot, a working machine, an electric assist bicycle, or an electric wheel chair, for example.

Features of the above-described preferred embodiments and the modifications thereof may be combined appropriately as long as no conflict arises. While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A rotor comprising:
a shaft extending along a center axis;
a rotor core being tubular and surrounding the shaft; and
a plurality of magnets disposed outside the rotor core in a radial direction and aligned in a circumferential direction,
wherein a plurality of first recessed portions recessed outward in the radial direction is aligned in the circumferential direction in an inner surface of the rotor core in the radial direction, and
each of the first recessed portions overlaps each of the magnets in the radial direction,
wherein a plurality of second recessed portions recessed inward in the radial direction is aligned in the circumferential direction in an outer surface of the rotor core in the radial direction, and
each of the second recessed portions overlaps each of the magnets in the radial direction,
wherein a length of the second recessed portions in the circumferential direction is equal to or less than a half of a length of the magnets in the circumferential direction.

2. The rotor according to claim 1, wherein a center of each of the first recessed portions in the circumferential direction overlaps, in the radial direction, a center of each of the magnets in the circumferential direction.

3. The rotor according to claim 1, wherein the first recessed portions are bent and recessed outward in the radial direction and are provided to be linearly symmetric in the circumferential direction.

4. The rotor according to claim 1, wherein a depth of the first recessed portions in the radial direction is greater than a distance in the radial direction between an outer surface of the rotor core in the radial direction and an outer end of the first recessed portion in the radial direction.

5. The rotor according to claim 1, wherein a depth of the first recessed portions in the radial direction is less than a maximum value of a thickness of the magnets in the radial direction.

6. The rotor according to claim 1, wherein a depth of the second recessed portions in the radial direction is less than a depth of the first recessed portions in the radial direction.

7. The rotor according to claim 1, further comprising:
an adhesive accommodated in the second recessed portions,
wherein the adhesive causes the magnets and the rotor core to adhere to each other.

8. The rotor according to claim 1, further comprising:
a coupling member disposed inside the rotor core in the radial direction and coupling the rotor core to the shaft,
wherein the coupling member includes a plurality of protruding portions projecting outward in the radial direction from an outer surface in the radial direction and aligned in the circumferential direction, and
each of the protruding portions is fitted to each of the first recessed portions.

9. The rotor according to claim 8, further comprising:
a male portion projecting in the radial direction from one of the outer surface of the coupling member in the radial direction and the inner surface of the rotor core in the radial direction; and
a female portion recessed in the radial direction from the other one of the outer surface of the coupling member in the radial direction and the inner surface of the rotor core in the radial direction and accommodating the male portion.

10. The rotor according to claim 1, further comprising:
a coupling member disposed inside the rotor core in the radial direction and coupling the rotor core to the shaft;
a male portion projecting in the radial direction from one of the outer surface of the coupling member in the radial direction and the inner surface of the rotor core in the radial direction; and
a female portion recessed in the radial direction from the other one of the outer surface of the coupling member in the radial direction and the inner surface of the rotor core in the radial direction and accommodating the male portion.

11. A rotor comprising:
a shaft extending along a center axis;
a rotor core being tubular and surrounding the shaft;
a plurality of magnets disposed outside the rotor core in a radial direction and aligned in a circumferential direction;
a coupling member disposed inside the rotor core in the radial direction and coupling the rotor core to the shaft;
a male portion projecting in the radial direction from the inner surface of the rotor core in the radial direction; and
a female portion recessed in the radial direction from the outer surface of the coupling member in the radial direction and accommodating the male portion,
wherein a plurality of first recessed portions recessed outward in the radial direction is aligned in the circumferential direction in an inner surface of the rotor core in the radial direction, and
each of the first recessed portions overlaps each of the magnets in the radial direction,
wherein a gap is provided between each of the first recessed portions and the outer surface of the coupling member.

12. The rotor according to claim 11, wherein a center of each of the first recessed portions in the circumferential direction overlaps, in the radial direction, a center of each of the magnets in the circumferential direction.

13. The rotor according to claim 11, wherein the first recessed portions are bent and recessed outward in the radial direction and are provided to be linearly symmetric in the circumferential direction.

14. The rotor according to claim 11, wherein a depth of the first recessed portions in the radial direction is greater than a distance in the radial direction between an outer surface of the rotor core in the radial direction and an outer end of the first recessed portion in the radial direction.

15. The rotor according to claim 11, wherein a depth of the first recessed portions in the radial direction is less than a maximum value of a thickness of the magnets in the radial direction.

16. The rotor according to claim 11,
wherein a plurality of second recessed portions recessed inward in the radial direction is aligned in the circumferential direction in an outer surface of the rotor core in the radial direction, and
each of the second recessed portions overlaps each of the magnets in the radial direction,
wherein a depth of the second recessed portions in the radial direction is less than a depth of the first recessed portions in the radial direction.

17. The rotor according to claim 16, further comprising:
an adhesive accommodated in the second recessed portions,
wherein the adhesive causes the magnets and the rotor core to adhere to each other.

* * * * *